(12) United States Patent
Simonin

(10) Patent No.: US 12,139,619 B2
(45) Date of Patent: Nov. 12, 2024

(54) BINDER COMPOSITION BASED ON BIOSOURCED INGREDIENTS AND USE THEREOF FOR FORMING NON-WOVEN GLASS-FIBRE WEBS

(71) Applicant: SAINT-GOBAIN ADFORS, Courbevoie (FR)

(72) Inventor: Léo Simonin, Paris (FR)

(73) Assignee: SAINT-GOBAIN ADFORS, Courbevoie (FR)

( * ) Notice: Subject to any disclaimer, the term of this patent is extended or adjusted under 35 U.S.C. 154(b) by 0 days.

(21) Appl. No.: 18/037,803

(22) PCT Filed: Nov. 19, 2021

(86) PCT No.: PCT/FR2021/052042
§ 371 (c)(1),
(2) Date: May 19, 2023

(87) PCT Pub. No.: WO2022/106789
PCT Pub. Date: May 27, 2022

(65) Prior Publication Data
US 2023/0407125 A1 Dec. 21, 2023

(30) Foreign Application Priority Data

Nov. 20, 2020 (FR) ...................... 2011924

(51) Int. Cl.
*C09D 103/02* (2006.01)
*C03C 25/1095* (2018.01)
*C03C 25/321* (2018.01)
*C09D 7/63* (2018.01)
*C09D 7/65* (2018.01)

(52) U.S. Cl.
CPC ........ *C09D 103/02* (2013.01); *C03C 25/1095* (2013.01); *C03C 25/321* (2013.01); *C09D 7/63* (2018.01); *C09D 7/65* (2018.01); *D06N 2201/082* (2013.01)

(58) Field of Classification Search
None
See application file for complete search history.

(56) References Cited

U.S. PATENT DOCUMENTS

2013/0032749 A1* 2/2013 Jaffrennou ............... C08J 5/043
156/181
2019/0382628 A1 12/2019 Alavi et al.

FOREIGN PATENT DOCUMENTS

WO WO-2013014399 A1 1/2013
WO WO2013072639 * 5/2013

OTHER PUBLICATIONS

Machine Translation of WO2013072639 (Year: 2013).*
International Search Report issued Mar. 10, 2022 in PCT/FR2021/052042 (with English translation), 5 pages.
Written Opinion issued Mar. 10, 2022 in PCT/FR2021/052042 (with English translation), 9 pages.

* cited by examiner

*Primary Examiner* — Shawn Mckinnon
(74) *Attorney, Agent, or Firm* — Element IP, PLC

(57) ABSTRACT

The invention relates to an aqueous binder composition containing, relative to the total dry weight of the binder composition, 10 to 40% by weight of a hydrogenated sugar, 25 to 55% by weight of citric acid, 25 to 50% by weight of a polysaccharide, and 1 to 10%, preferably 2 to 6%, by weight of sodium hypophosphite or hypophosphorous acid. The polysaccharide is dissolved in the aqueous binder composition and chosen from functionalized starches and dextrins having a weight-average molar mass of between 150,000 and 2,000,000 and a solubility in water of between 50 and 85%. The invention also relates to a method for manufacturing non-woven webs based on mineral or organic fibers using such a composition and the non-woven webs thus obtained.

14 Claims, No Drawings

BINDER COMPOSITION BASED ON BIOSOURCED INGREDIENTS AND USE THEREOF FOR FORMING NON-WOVEN GLASS-FIBRE WEBS

The invention relates to a novel binder composition based on biosourced ingredients making it possible to bind mineral or organic fibers and to obtain non-woven webs. It also relates to a method for manufacturing non-woven webs using such a binder composition and a web obtained by this method.

Mats of mineral and/or organic fibers (also referred to as "non-woven fabrics" or "webs") can be manufactured according to known methods operating by dry-route or wet-route processes.

In the dry-route process, molten matter present in a furnace is conveyed toward a set of bushings from which filaments flow out by gravity and are drawn by a gaseous flow. The filaments are collected on a conveyor, where they become entangled, forming a non-woven web or mat.

A binder composition is applied to the upper face of the web thus formed using an appropriate device, generally proceeding by curtain coating, and the excess binder composition is removed by suction at the opposite face. The web then enters a hot-air oven, the temperature of which is suitable for removing the water and cross-linking the binder composition in a fairly short time, then the mineral fiber mat is collected and wound.

In the wet-route process, the web is obtained from an aqueous dispersion of cut organic or mineral fibers which is deposited by means of a forming head on a conveyor provided with perforations and the water is extracted through the conveyor by virtue of a suction box. The cut fibers remaining on the conveyor form a web which is treated under the same conditions as those disclosed for the dry-route process.

In the above-mentioned processes, the role of the binder is to bind the fibers to one another and to confer, on the web obtained, mechanical properties suitable for the desired use, especially sufficient stiffness to allow it to be easily handled especially without any risk of it being torn.

The binder composition to be applied to the organic or mineral fibers is generally in the form of an aqueous solution containing at least one thermosetting resin and additives, such as an adhesion-promoting silane, a water repellent, etc.

For more than a decade, manufacturers of insulating products based on mineral wool have been offering binder compositions that are formaldehyde-free and that are nearly exclusively based on biosourced ingredients, in particular based on carbohydrates, making it possible to replace the phenol/formaldehyde resins that were used before.

It has thus been proposed to form insoluble binders by Maillard reaction between reducing sugars and a nitrogen source, for example an amine (see for example WO 2007/014236 and WO 2009/019232). The products obtained generally have a brown color, attributed to the melanoidins formed.

Thermosetting binders with a lighter, even white color, also based on biosourced and formaldehyde-free ingredients were proposed shortly after (see for example WO 2010/029266 and WO 2013/014399). These binders are based on the reaction between hydrogenated sugars (alditols) and citric acid in the presence of a catalyst, such as sodium hypophosphite (HPS).

The Applicant, when seeking to use these binders based on hydrogenated sugars and citric acid to manufacture non-woven webs made of mineral fibers or organic fibers, bound by formaldehyde-free biosourced binders, found that the products obtained admittedly had satisfactory mechanical properties when they were dry, but that their mechanical strength, in particular their tensile strength, was greatly degraded in the wet state.

This may be particularly troublesome when the non-woven web is used as surfacing or as a support layer for complex products, such as thermal insulation products based on mineral wool, bituminous membranes or even plasterboards. Indeed, the methods for manufacturing these multilayer products often involve placing non-woven webs in contact with materials containing water, for example bituminous emulsions, compositions based on hydraulic binders or even freshly sized mineral wool fibers, while simultaneously applying a tensile force essential for the product to travel through the production line. When the non-woven web has insufficient tensile strength in the wet state, it can tear, which will then require the production line to stop.

After many tests aimed at finding biosourced reagents that make it possible to reinforce the polymeric network of the cured binder and in particular to limit the degradation of the tensile strength in the wet state, the Applicant has found that the addition of a relatively large amount of a polysaccharide such as starch or dextrin to the alditol/citric acid/HPS reaction system made it possible to significantly improve the mechanical properties in the wet state of the webs obtained. To be effective, the starch or dextrin must have a relatively high molecular weight (several hundred thousand daltons) while being in the dissolved state, at least predominantly dissolved in water and as a result in the reaction medium (binder composition). Dextrins having molecular weights of only a few thousand daltons have proven to be ineffective.

The present invention therefore relates to an aqueous binder composition comprising
  10% to 40% by weight of a hydrogenated sugar,
  25% to 55% by weight of citric acid,
  25% to 50% by weight of a polysaccharide, dissolved in the aqueous binder composition, chosen from the group consisting of dextrins having a weight-average molar mass of between 150,000 and 2,000,000 and a solubility in water of between 50 and 85% and functionalized starches, and
  1 to 10% by weight, preferably 2 to 6% by weight, of sodium hypophosphite or hypophosphorous acid,
  those percentages being expressed relative to the total dry weight of the binder composition.

The binder compositions of the present invention are thermosetting compositions. The thermosetting reaction is carried out mainly between the citric acid and the hydrogenated sugar(s), in particular the primary hydroxyl functions of these hydrogenated sugars, which are more reactive in esterification than the secondary hydroxyl groups. It is catalyzed by sodium hypophosphite or hypophosphorous acid. This reactive system is known and disclosed for example in international applications WO 2010/029266 and WO 2013/014399.

The Applicant was surprised to find that the addition to this reaction system of a relatively large amount of starch or dextrin, which may range up to about 50% by weight, would result, not in a weakening of the mechanical properties of the cured binder following the "dilution" of the reactive groups (primary hydroxyls and carboxyl), but on the contrary in a mechanical reinforcement of the cured binder, in particular in the wet state. This mechanical reinforcement was however only obtained when the dextrin/starch was of high mass and at least partially soluble in the reaction medium. The incorporation of native starch, in the form of non-gelatinized and non-solubilized grains, in the binder composition did not make it possible to improve the tensile strength in the wet state of the non-woven webs.

It is possible to use any hydrogenated sugar in the thermosetting binder compositions of the present invention.

"Hydrogenated sugar" means all of the products resulting from the reduction of a saccharide (carbohydrate) chosen from the monosaccharides, disaccharides, oligosaccharides and polysaccharides and mixtures of these products. Hydrogenated sugars are also referred to as sugar alcohols, alditols or polyols. They can be obtained by catalytic hydrogenation of saccharides. The hydrogenation can be carried out by known methods implemented under high hydrogen pressure and temperature conditions, in the presence of a catalyst chosen from the elements of groups IB, IIB, IVB, VI, VII and VIII of the periodic table of elements, preferably from the group comprising nickel, platinum, palladium, cobalt, molybdenum and mixtures thereof. The preferred catalyst is Raney nickel.

The hydrogenated sugar(s) are advantageously chosen from the group consisting of erythritol, arabitol, xylitol, sorbitol, mannitol, iditol, maltitol, isomaltitol, lactitol, cellobitol, palatinitol, maltotritol, and the hydrogenation products of starch hydrolysates or hydrolysates of lignocellulosic materials, especially hemicellulose, in particular xylans and xyloglucans, preferably from the group consisting of xylitol, maltitol, sorbitol and hydrogenation products of starch hydrolysates or lignocellulosic materials. Among these hydrogenated sugars, maltitol (which has three primary hydroxyl functions) is particularly preferred.

Starch hydrolysates are products obtained by enzymatic and/or acid hydrolysis of starch.

The preferred starch hydrolysates advantageously have, before the hydrogenation step, a dextrose equivalent (DE) of between 10 and 99, preferably between 15 and 80.

The weight ratio of hydrogenated sugar to citric acid is advantageously of between 0.2 and 1.0, preferably between 0.3 and 0.9, more preferentially between 0.4 and 0.8.

The hydrogenated sugar, citric acid and polysaccharide (functionalized starch/dextrin) are the main constituents of the binder compositions of the present invention. Together they represent at least 70%, preferably at least 75%, and ideally at least 80% of the dry weight of the binder composition before cross-linking.

The polysaccharide used to reinforce the mechanical performance in the wet state must be soluble and dissolved in the aqueous binder composition. The solubility of the polysaccharide is obtained by functionalization of a starch or by dextrinization of a starch. The solubility of the dextrinized or functionalized starch is not necessarily total and a limited part of the starch may remain in finely dispersed form in the binder composition. A polysaccharide (functionalized or dextrinized starch) is considered to be dissolved/soluble in the binder composition when, at 20° C., the majority, that is, more than 50% by weight of the polysaccharide, preferably more than 70% by weight and ideally more than 90% by weight, is in the dissolved state. If necessary, the solubilization can be obtained by heating an aqueous dispersion of the polysaccharide, especially by heating in an autoclave to a temperature of between 110° C. and 130° C., followed by cooling to ambient temperature.

The polysaccharide contents of the binder composition are those of the total fraction comprising the dissolved fraction and the dispersed fraction.

High mass and at least partially water-soluble dextrins are known and disclosed in international application WO 2013/072639.

They have a weight-average molar mass of between 150,000 and 2,000,000, preferably between 250,000 and 2,000,000. This weight-average molecular mass is expressed in daltons (Da) and can be determined by size-exclusion chromatography coupled with a light-scattering device (HPSEC-MALLS).

For this purpose, the dextrin is totally solubilized by heating to a temperature of 100° C. for 30 minutes in a solvent consisting of a solution of 0.1 M $NaNO_3$ in DMSO, the dextrin concentration being of between 2 and 10 mg/ml of solvent. A high performance liquid chromatography (HPLC) apparatus is used, provided with a pump operating in isocratic mode, circulating an elution solvent (aqueous solution of sodium nitrate at 0.1 M containing 0.02% by mass of sodium azide) with a flow rate of 0.3 mL/min. The apparatus is further provided with a refractometric detector and a multi-angle laser light scattering (MALLS) detector, for example a DAWN DSP detector from the Wyat company, heated to 35° C. The column is a Suprema polyhydroxymethacrylate column thermostatically controlled at 35° C. The injection volume is 100 µL.

The weight-average and number-average molecular weights can be determined from spectra obtained by $1^{st}$ order exponential reprocessing of the spectra, using the ASTRA v.4 analysis software.

The solubility of the dextrins is determined according to test A comprising the following steps:

taking a mass of test sample ($m_{test\ sample}$) of about 5.0 g of dextrin, this mass being expressed in dry weight, dispersing the mass of test sample in 200 mL of water at 22° C. in an Erlenmeyer, which is then placed at 22° C. in a water bath for 4 hours under magnetic stirring with stirring for 5 minutes every 30 minutes;

filtering the contents of the vial on a filter with a porosity of 8 pm, for example of the Whatman 2 V type;

pipetting 50 mL of filtrate and introducing this amount into a dry and calibrated crystallizing dish;

evaporating the water from the crystallizing dish by heating to 60° C. for 45 minutes, then to 130° C. for 90 minutes;

after cooling in a desiccator, weighing the obtained dry mass of dextrin ($m_{dry\ extract}$).

The solubility is calculated as follows:

$$\text{Solubility} = (m_{dry\ extract} \times 200 \times 100)/(50 \times m_{test\ sample})$$

The dry mass of the test sample is calculated according to ISO standard 1666:1996.

The dextrins used in the invention advantageously have a polydispersity index greater than 5, preferably greater than 10, and even more preferentially greater than 15.

The solubility of the dextrins, determined according to test A disclosed hereinbefore, is preferably of between 55 and 65%.

Their weight-average molecular mass is preferably of between 380,000 Da and 1,400,000 Da.

The functionalized starches that can be used in the aqueous binder composition of the present invention are preferably chosen from the group consisting of etherified starches and esterified starches, in particular acetylated starches and hydroxyalkylated starches, such as hydroxyethyl starches and hydroxypropyl starches. Acetylated starches are particularly preferred.

Their weight-average molecular mass is preferably of between 150,000 and 2,000,000.

Their degree of functionalization must be sufficient to allow the dissolution of the starch in water by heating in an autoclave. The starch generally remains at least partially soluble in water after returning to ambient temperature.

In the context of their tests aimed at developing binder compositions making it possible to grant the non-woven webs a high tensile strength, in particular in the wet state, the inventors further discovered two types of compounds that made it possible to further improve the performance of the final product.

The first type of compound is a polycarbodiimide, namely a compound having at least two, preferably at least three carbodiimide functions (—N=C=N—). This compound probably increases the cross-linking density of the thermosetting system by reacting with the carboxyl functions of the citric acid. The binder compositions of the present invention advantageously contain 4 to 20% of a polycarbodiimide, this percentage being expressed relative to the total weight of hydrogenated sugar, citric acid and polysaccharide.

It is possible to indicate, as examples of polycarbodiimides, which can be used in the present invention, the commercial products Permutex® XR-5508 and Permutex® XR-13-554 sold by the Stahl company.

The second type of compound making it possible to further improve the tensile strength of the non-woven webs is chosen from the low-weight polyols (polyhydric alcohols), generally less than 500, having at least three functions, generally 3 to 6 primary hydroxyl functions.

Mention may be made by way of examples of such polyols, of trimethylolpropane, trimethylolbutane, pentaerythritol, dipentaerythritol, triethanolamine and poly-beta-hydroxyalkylamides. Poly-beta-hydroxyalkylamides are particularly preferred.

In a preferred embodiment, the binder composition of the present invention comprises 4 to 20% of a polyol having a molecular mass of less than 500 and having from 3 to 6 primary alcohol functions, this percentage being expressed relative to the total weight of hydrogenated sugar, citric acid and dextrin.

The preparation of the binder compositions of the present invention is generally quite simple.

When the polysaccharide is a dextrin, it is preferable to first dissolve the dextrin in a sufficient amount of water and then to add the hydrogenated sugar, citric acid and catalyst. It is generally not necessary to heat the composition.

When the polysaccharide is a functionalized starch that is not soluble when cold, it is recommended to first disperse it in water and subsequently to heat the dispersion in an autoclave (for example, heating an aqueous dispersion with 20% starch for 2 hours to a temperature of 130° C.). The majority of the starch thus solubilized remains soluble in the water after cooling to ambient temperature.

The binder composition of the present invention, at the time when it is applied to the non-woven mat advantageously has a solids content of between and 20%, preferably between 8 and 15% by weight.

It may contain, in addition to the four or five ingredients disclosed hereinbefore, known additives, such as coupling agents, for example aminosilanes or epoxysilanes, reactive or non-reactive silicones.

The present application also relates to a method for manufacturing a non-woven web of mineral fibers and/or organic fibers, which comprises
applying an aqueous binder composition as disclosed hereinbefore to a set of mineral or organic fibers gathered in the form of a non-woven web, and
heating the non-woven web of mineral or organic fibers coated with the binder composition to a sufficient temperature and for a sufficient duration to carry out the cross-linking of the binder composition and the formation of an insoluble and infusible cross-linked binder.

The mineral fibers of the non-woven web are preferably glass fibers.

The mineral fibers may be filaments or yarns composed of a multitude of filaments and assemblies of such yarns.

Thus, according to a first embodiment, the mat of mineral fibers is composed of discontinuous mineral filaments with a length which can reach 150 mm, preferably of between 20 and 100 mm and advantageously between 50 and 70 mm, and which have a diameter which can vary within wide limits, for example from 5 to 30 μm.

According to a second embodiment, the mat of mineral fibers is composed of mineral yarns.

The mineral yarns may be yarns composed of a multitude of mineral filaments (or base yarns) or assemblies of these base yarns in the form of rovings.

The abovementioned yarns can be zero-twist yarns or twisted yarns (or textile yarns), preferably zero-twist yarns.

The mineral yarns, especially glass yarns, are generally cut to a length which can range up to 100 mm, preferably of between 6 and 30 mm, in particular between 8 and 20 mm and better still from 10 to 18 mm.

The diameter of the glass filaments constituting the yarns may vary widely, for example from 5 to 30 μm. In the same way, wide variations may occur in the linear mass of the yarn which may range from 34 to 1500 tex.

The glass constituting the filaments can be of any type, for example C, E, R or AR (alkali-resistant). C and E glass are preferred.

The organic fibers are preferably polyester fibers, in particular poly(ethylene terephthalate) fibers, which are stretched. They may be solid or hollow. Preferably, at least part of the organic fibers are recycled fibers. Short fibers (staple fibers) are preferably used, having a length ranging from 30 mm to 120 mm and a titer of between 1.5 and 7 den.

Of course, the non-woven web of the present invention may contain a mixture of mineral and organic fibers, in particular a mixture of glass fibers and polyester fibers.

In a known manner, the binder composition is deposited on the mat of fibers, formed by the dry-route or the wet-route process, then the mat is treated at a temperature enabling the cross-linking of the binder, which then becomes infusible.

The cross-linking of the binder composition according to the invention is advantageously done by heating to a temperature of between 180 and 230° C., preferably between 190 and 220° C., and for a period of between 10 seconds and 2 minutes, preferably between 15 seconds and 1 minute.

Finally, the present application also relates to a non-woven web capable of being obtained by the method disclosed hereinbefore.

This non-woven web advantageously has a loss on ignition (LOI) of between 10 and 40% by weight, preferably between 15 and 35% by weight, even more preferentially between 20 and 30% by weight.

Its mass per unit area is advantageously of between 25 and 400 g/m$^2$, preferably between 30 and 250 g/m$^2$, and more preferentially between 35-150 g/m$^2$.

EXAMPLES

Aqueous binder compositions are prepared comprising the ingredients indicated in Table 1 below.

Comparative Composition A (Absence of Polysaccharide)

Maltitol is dissolved in water, then citric acid and sodium hypophosphite (HPS) are added to the obtained solution. After complete dissolution of the ingredients, it is diluted to a dry matter content of 10%.

Comparative Composition B (Polysaccharide=Maltodextrin)

A maltodextrin having a dextrose equivalent (DE) of about 16.5 to 19.5 is dissolved in water, then maltitol, citric acid and HPS are added and the mixture is stirred at ambient temperature until all of the ingredients have dissolved. After complete dissolution of the ingredients, the dry matter content of the composition is adjusted to 10% by weight.

Composition 1 (According to the Invention)

A partially soluble dextrin having a weight-average molar mass of 200,000 Da, sold under the name Stabilys® LAB 4511, is dissolved/dispersed in water at ambient temperature. Maltitol, citric acid and HPS are then added. After dissolution of these ingredients, the dry matter content of the composition is adjusted to 12% by weight.

Composition 2 (According to the Invention)

A partially soluble dextrin having a weight-average molar mass of 200 kDa, sold under the name Stabilys® LAB 4511, is dissolved/dispersed in water at ambient temperature. Maltitol, citric acid and HPS and, as additional cross-linking agent, a polycarbodiimide (Permutex® XR13-554 sold by the Stahl company) are added to the dextrin solution. The solids content is adjusted to 9% by weight.

Composition 3 (According to the Invention)

A partially soluble dextrin having a weight-average molar mass of 200 kDa, sold under the name Stabilys® LAB 4511, is dissolved/dispersed in water at ambient temperature. Maltitol, citric acid, HPS and, as additional cross-linking agent, a beta-hydroxyalkylamide (Primid® XL-552 sold by the EMS Chemie company) are added to the dextrin solution. The solids content is adjusted to 11% by weight.

Composition 4 (According to the Invention)

An acetylated starch (Tackidex G076 sold by the Roquette company) is dissolved in water by heating in an autoclave (130° C., 2 bar, dry extract of 21%), then, after cooling to ambient temperature, maltitol, citric acid and HPS are added. After dissolution of all the ingredients, the dry matter content of the composition is adjusted to 9% by weight.

The ingredients of the different comparative compositions and of the compositions according to the invention as well as their respective amounts are given in Table 1 below. The amounts are expressed as a % relative to the dry weight of the composition.

TABLE 1

| Composition | maltitol | Citric acid | polysaccharide | cross-linking agent | HPS |
|---|---|---|---|---|---|
| A | 31.8 | 63.5 | — | — | 4.7 |
| B | 21.9 | 43.8 | 29.6 (maltodextrin) | — | 4.7 |
| 1 | 21.9 | 43.8 | 29.6 (Stabilys LAB4511) | — | 4.7 |
| 2 | 19.4 | 38.8 | 28.8 (Stabilys LAB4511) | 8.8 | 4.7 |
| 3 | 18.5 | 36.8 | 27.5 (Stabilys LAB4511) | 13.2 | 4.0 |
| 4 | 21.9 | 43.8 | 29.6 (Tackidex G076) | — | 4.7 |

Compositions A, B and 1-4 are used for manufacturing non-woven webs. For this purpose, each of the compositions of Table 1 is applied to a non-woven glass-fiber web having a weight per unit area of 35 g/m² by immersing this web in the previous solutions.

After applying the binder composition, the impregnated web is heated for 60 seconds to a temperature of 210° C.

From the webs thus obtained, samples of 30 cm×5 cm are cut out at the die in order to take measurements of tensile strength. The tensile strength in the dry state is determined by measuring the breaking force under uniaxial tension (100 mm/min, useful length of 20 cm) of the samples immediately after curing.

The tensile strength in the wet state is determined in the same way on samples that have remained for 10 minutes in water at 80° C.

Table 2 shows the tensile strengths in the dry and wet state for all the webs obtained. Each result is an average calculated from 12 samples, taken from a single web.

TABLE 2

| Composition | polysaccharide | LOI (%) | Weight per unit area (g/m²) | Tensile strength in the dry state (N/5 cm) | Tensile strength in the wet state (N/5 cm) |
|---|---|---|---|---|---|
| A | — | 22.7 ± 0.7 | 35.0 | 73.4 ± 13.1 | 24.3 ± 6.6 |
| B | maltodextrin | 27.1 ± 1.5 | 37.2 | 108.5 ± 16.1 | 29.1 ± 8.1 |
| 1 | Stabilys LAB4511 | 26.5 ± 4.9 | 37.1 | 109.1 ± 25.6 | 50.0 ± 12.3 |
| 2 | Stabilys + polycarbodiimide | 22.6 ± 0.9 | 34.4 | 100.6 ± 9.5 | 60.9 ± 7.5 |
| 3 | Stabilys + hydroxyalkylamide | 22.7 ± 2.0 | 34.6 | 105.3 ± 14.7 | 65.5 ± 6.4 |
| 4 | Tackidex | 24.5 ± 1.3 | 36.1 | 125.8 ± 17.5 | 39.5 ± 5.2 |

It is noted that the addition of a dextrin with high molecular weight that is partially soluble in water (Stabilys LAB4511) makes it possible to obtain webs having a tensile strength in the wet state that is twice as high.

The addition of a polycarbodiimide or a polyhydric alcohol (beta hydroxyalkylamide having four OH functions) further increases this tensile strength in the wet state.

Conversely, a maltodextrin with low molecular weight (composition B) does not provide a significant improvement in tensile strength.

The use of a functionalized starch (Tackidex G076) provides a less remarkable improvement than that of a dextrin with high molecular weight that is partially soluble in water at ambient temperature.

The invention claimed is:

1. An aqueous binder composition, comprising:
   10 to 40% by weight of a hydrogenated sugar,
   25 to 55% by weight of citric acid,
   25 to 50% by weight of a polysaccharide, which is dissolved in the aqueous binder composition and is selected from the group consisting of a dextrin having a weight-average molar mass of between 150,000 and 2,000,000 and a solubility in water of between 50 and 85% at ambient temperature and a functionalized starch, and
   1 to 10% by weight of sodium hypophosphite or hypophosphorous acid,
   said percentages being expressed relative to a total dry weight of the binder composition.

2. The aqueous binder composition according to claim 1, wherein the hydrogenated sugar, citric acid, and polysaccharide together represent at least 70% of the dry weight of the binder composition.

3. The aqueous binder composition according to claim 1, wherein the hydrogenated sugar is selected from the group consisting of erythritol, arabitol, xylitol, sorbitol, mannitol, iditol, maltitol, isomaltitol, lactitol, cellobitol, palatinitol, maltotritol, and a hydrogenation product of a starch hydrolysate or a lignocellulosic material.

4. The aqueous binder composition according to claim 1, wherein the polysaccharide is a functionalized starch, which is selected from the group consisting of an etherified starch and an esterified starch.

5. The aqueous binder composition according to claim 1, wherein a weight ratio of the hydrogenated sugar to citric acid is between 0.2 and 1.0.

6. The aqueous binder composition according to claim 1, further comprising:
   relative to a total weight of the hydrogenated sugar, citric acid, and the polysaccharide, 4 to 20% of a polycarbodiimide.

7. The aqueous binder composition according to claim 1, further comprising:
   relative to a total weight of the hydrogenated sugar, citric acid, and the polysaccharide, 4 to 20% of a polyol having a molecular mass of less than 500 and having from 3 to 6 primary alcohol functions.

8. The aqueous binder composition according to claim 1, which has a solid content of between 5 and 20% by weight.

9. A method for manufacturing a non-woven web of mineral fibers and/or organic fibers, the method comprising:
   applying the aqueous binder composition according to claim 1 to a set of mineral and/or organic fibers gathered in the form of a non-woven web, and
   heating the non-woven web of mineral and/or organic fibers coated with the binder composition to a sufficient heating temperature and for a sufficient heating time to cross-link the binder composition and to form an insoluble and infusible cross-linked binder.

10. The method according to claim 9, wherein the heating temperature is between 180° C. and 230° C. and the heating time is between 10 seconds and 2 minutes.

11. A non-woven glass-fiber web, obtained by the method according to claim 9.

12. The non-woven glass-fiber web according to claim 11, which has a loss on ignition (LOI) of between 10 and 40% by weight.

13. The non-woven glass-fiber web according to claim 11, which has a mass per unit area of between 25 and 400 g/m².

14. The aqueous binder composition according to claim 1, wherein the polysaccharide is the dextrin, which has a polydispersity index of 15 or more.

* * * * *